May 7, 1929.  F. E. CLARK  1,712,068
PROCESS OF AND APPARATUS FOR PRODUCING INELASTIC FIBROUS MATERIAL
Filed Oct. 24, 1921   3 Sheets-Sheet 1

Inventor.
Frank E. Clark.
Gray and Lilly
Attorney.

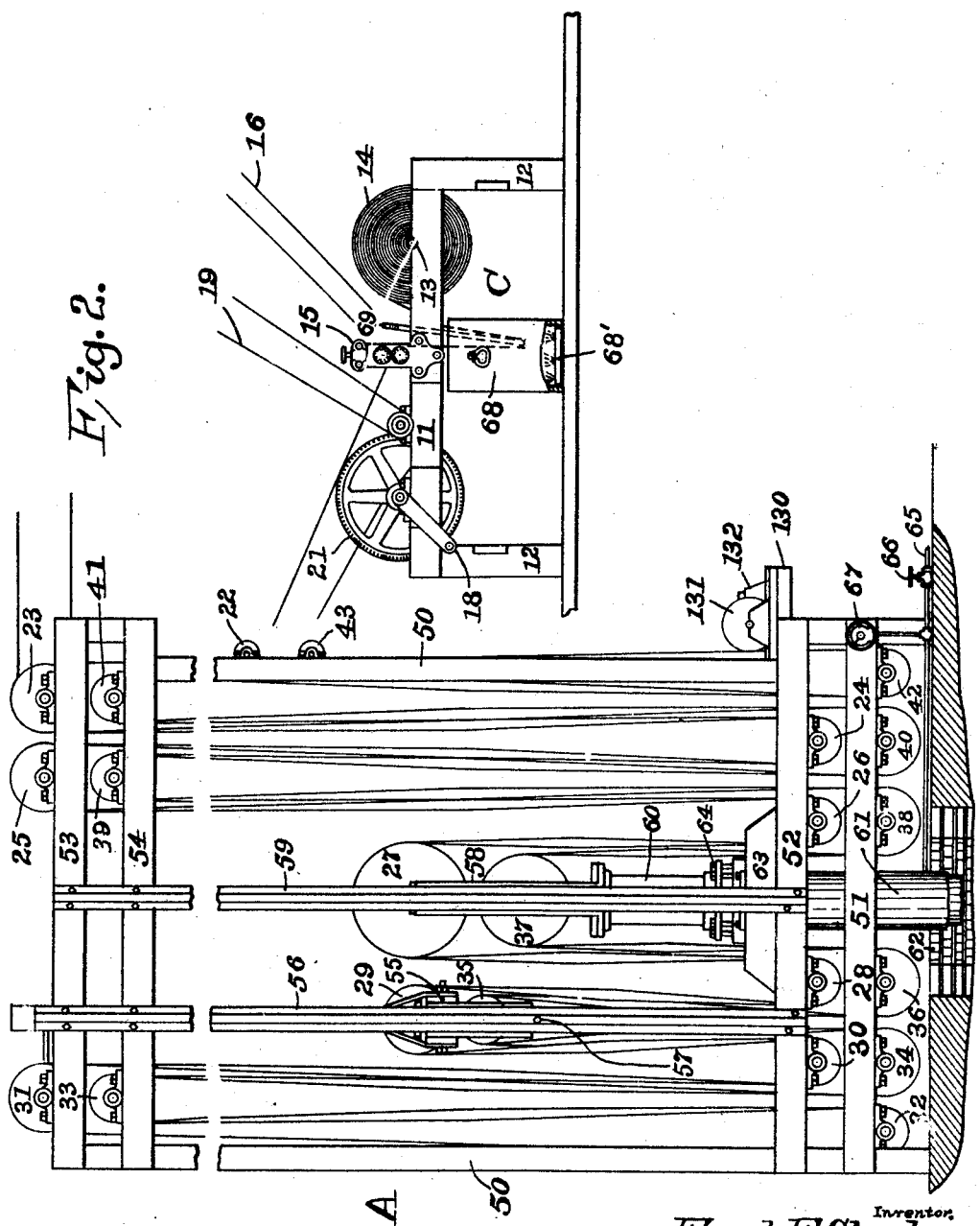

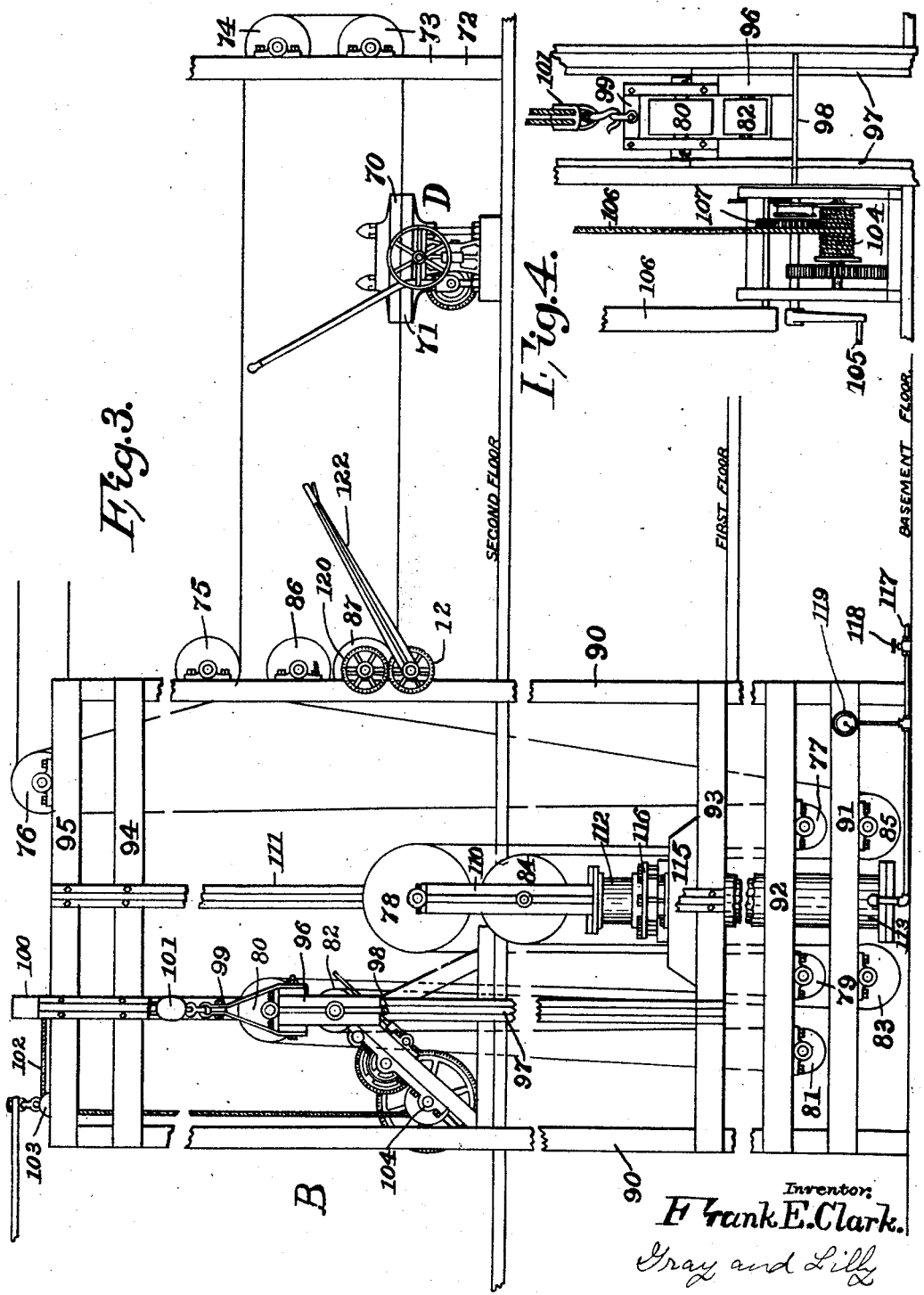

Patented May 7, 1929.

1,712,068

UNITED STATES PATENT OFFICE.

FRANK E. CLARK, OF JAMESTOWN, NEW YORK.

PROCESS OF AND APPARATUS FOR PRODUCING INELASTIC-FIBROUS MATERIAL.

Application filed October 24, 1921. Serial No. 510,119.

My invention relates to a process of and apparatus for producing inelastic fibrous material.

More particularly, my invention relates to a process and apparatus for stretching fibrous material to such a degree that it will not yield further under the strain for which it is intended, and so treating it in such stretched condition that it will not shorten when the tension is removed.

My invention further relates to a process and apparatus for manufacturing leather faced cotton backed belting which will not stretch under its intended load and whereby such belting may be made without waste of time or factory space and with certainty and uniformity in reaching the exact quality of product desired.

Other objects and improvements embodied in the process and apparatus will appear as the description proceeds.

My invention makes commercial use of discoveries of the effects of tension on fibrous materials, especially cotton belting. The discoveries and their utilization will be disclosed in the following specification as applied to making leather faced cotton backed belting; but the broad features of the invention are capable of wide application in the production of other articles, and the scope of the invention I claim is limited only by the terms of the appended claims.

In making leather faced cotton backed belting, it is customary to first stretch the cotton backing, impregnate it with a suitable solution, and dry it in elongated condition, so as to reduce the further elongation under working conditions. The leather facing is then glued to the treated backing.

When cotton belting is subjected to the tension usually employed in the above described process, it continues to elongate indefinitely while the tension is continued; or, if it is stretched a certain amount and held to that length, it gradually becomes slack. Even after treatment and facing this quality persists to some extend. Continued stretch in use causes annoyance through the necessity for frequently taking up slack to maintain the proper working tension, and shortens the life of the belt by subjecting the facing to tensile strains which should be borne by the backing, or by causing the separation of the facing and backing. Moreover, such belts have been lacking in uniformity, and where a belt was secured which gave satisfaction in a particular use, there was no way by which the belt could be reproduced with any certainty.

The desired improvement in this art was some way to make belts so that the backing would not stretch in use, and some way of reproducing with a fair degree of accuracy and certainly any belt that proved especially satisfactory.

A belt of fixed length might be produced if the belting could be stretched to a point where further increase of tension would produce no further elongation, and if the belting so stretched to its elastic limit could be impregnated and dried in that condition so as to retain its maximum length; but I have discovered that increased tension continues to produce elongation up to the breaking point. There is no elastic limit for cotton belting short of the breaking point.

The attempt has sometimes been made to produce a uniform product by impregnating and drying under a tension that produced a certain percentage of elongation, say, an inch to the foot; but belts so made are not uniform in quality. Measurement of elongation during manufacture has proven of little use, and belting has usually been made with no guide as to the amount of tension applied except the instinct of the particular man in charge.

I have discovered that a given amount of tension will produce quite different percentages of elongation not only in belting from different factories and different looms, but even in different portions of the same roll of belting. Probably this accounts for the failure of the measurement of elongation as a guide in manufacture.

Many tests on belts of different widths and different numbers of ply and from different factories failed to disclose any material departure in actual practice from the calculated breaking stress found by multiplying together the width in inches, number of ply, and standard breaking stress per inch of single ply which is 200 pounds. I found, therefore, that standard cotton belting responds with marked uniformity to a measured tensile stress calculated to produce rupturing; and I further discovered that the quality of belts produced under tension of a given number of pounds per inch ply is practically uniform. Measurement and recording of the tension applied during manufacture furnishes a guide by which any previously manufactured belt can be reproduced with accuracy and certainty. This is an important discovery.

My most important discovery is what I call the point of fixed elongation. The continued stretch during application of tension, referred to above, persists to a point above that usually reached in the manufacture of belts; but when the tension is increased, a point is reached, well below the breaking point, where all of the elongation which a given stress per inch ply will produce takes place promptly. When subjected to a strain equal to or above this point, the stress may be continued for an indefinite period of time without resulting in further elongation. This is what I call the point of fixed elongation.

One way I apply this discovery is to stretch cotton belting at least to the point of fixed elongation and maintain the stretch while an impregnating material is hardening therein. Where, before tension is applied, the belting is impregnated with a wetting solution, such as glue size, slow elongation will continue during drying even when a tension is used that would produce fixed elongation in dry belting. But I have discovered that when such degree of tension is used, the resulting dried material is of fixed elongation, and will not further elongate under continued tension until the stress is greater than that used during stretching. Where the point of fixed elongation is referred to hereinafter in description and claims as a measure of tension, the stress necessary for that result in dry material is meant, as that is the stress which is effective in producing the desired quality of finished article.

I will now describe the preferred embodiment of my apparatus and process as applied to making faced cotton belting.

In the annexed drawings showing the preferred form of apparatus:

Fig. 2 is a side elevation of a portion of the apparatus for impregnating, stretching and drying.

Fig. 3 is a side elevation of a portion of the apparatus for facing and drying; and Fig. 4 is a detail showing the arrangement of an adjustable pulley carrier.

Figure 1:
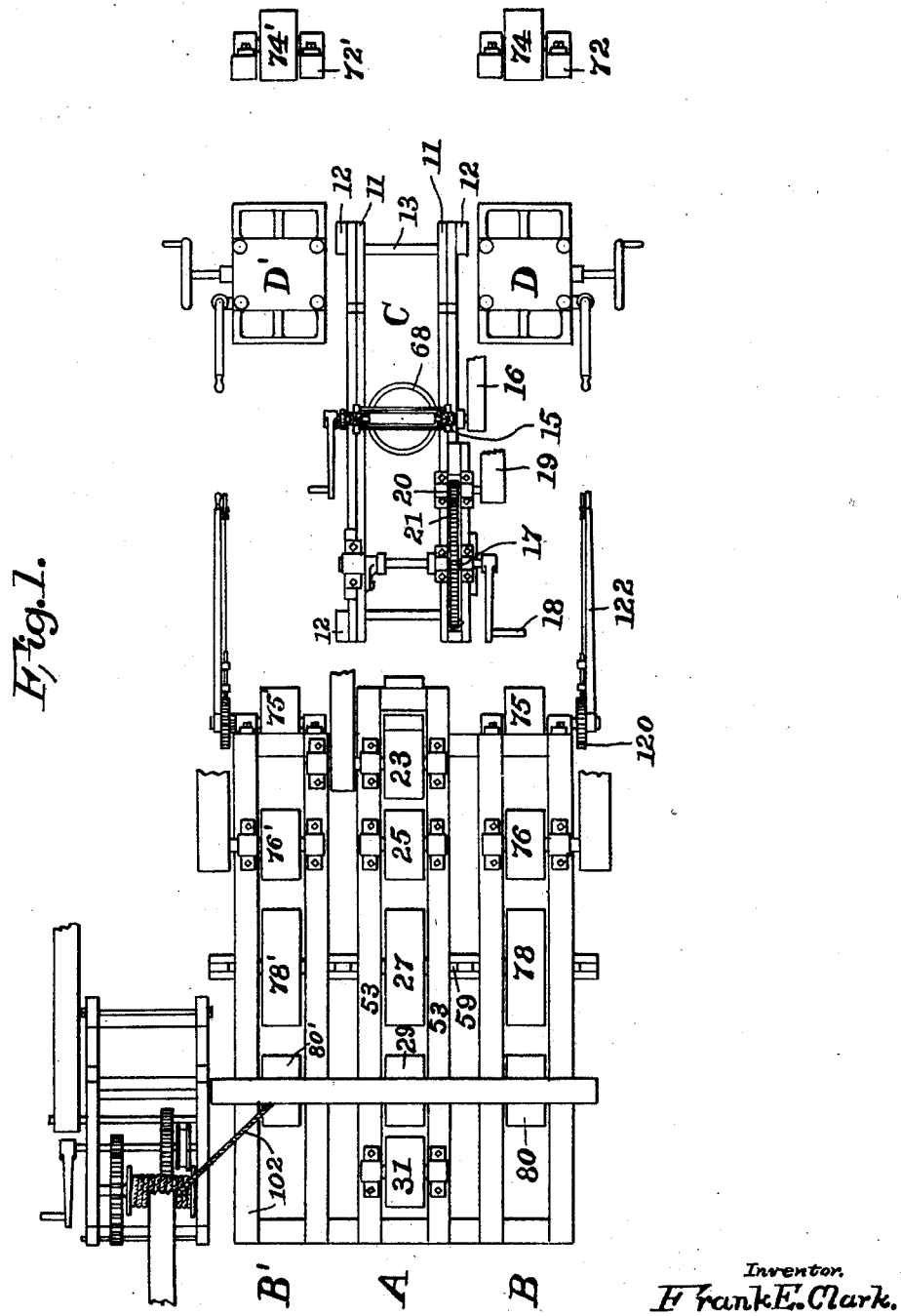
Figure 1 is a plan view, partly broken away and with some parts removed.

The apparatus comprises three sets of pulleys, A, B and B', arranged to receive and place under tension endless belts; a device C, adapted to impregnate belting and feed it to pulley set A; and two presses, D and D', adapted to press facing material upon a backing and feed the faced belting to pulley set B or B', respectively.

The impregnating device, C, and the pulley set A are primarily intended for receiving cotton belting as it comes from the loom, impregnating it with a suitable material, and stretching and drying so that the belt will not thereafter elongate under ordinary stress, and this combination will be referred to hereafter as the "stretcher." Each press with its accompanying pulley set will be called a "builder".

The pulley systems are arranged to provide comparatively long vertical runs for the belt threaded therethrough, and, as shown, each system extends from the floor of the basement to the top of the upper story. In the arrangement shown the impregnating device is shown on the first floor, and comprises two parallel bars 11, mounted on legs 12. Supported at one end of these bars is a shaft 13, which is adapted to receive a roll of belting 14. Midway of the bars 11 there is mounted a wringer 15, which may be operated by hand or by a power belt 16. Beneath the wringer there is positioned a pot adapted to contain an impregnating solution. At the ends of the bars nearest the pulley set A there is a windlass 17 adapted to be turned by a hand crank 18 or by a power belt 19 through gears 20 and 21.

The pulley set A as shown, comprises twenty-two pulleys suitably mounted and designated 22 to 43, inclusive. The framework upon which these pulleys are mounted comprises uprights 50 extending from the basement to the upper story.

At the lower ends of these uprights there is a set of crosspieces 51 upon which are mounted pulleys 32, 34, 36, 38, 40 and 42. Just above the crosspieces 51 there is another set, 52, upon which are mounted pulleys 24, 26, 28 and 30. At the top end of the uprights there is a set of cross pieces 53, carrying pulleys 23, 25 and 31, while a set of cross pieces, 54, just beneath the top set, carries pulleys 33, 39 and 41.

A slide 55, carrying pulleys 29 and 35, is mounted for vertical adjustment in guides 56 and is supported in adjusted position by a horizontal rod, 57, passing through the guides beneath the slide.

Another slide, 58, carrying pulleys 27 and 37 is mounted in vertical guides 59 and is moved vertically by a piston 60 operating in cylinder 61. In order to obtain a long movement of slide 58, the cylinder is extended downwards below the basement floor in a well 62.

The top end of the cylinder is held by a framework 63 attached to cross pieces 52, and packing 64 prevents leakage at the top end of the cylinder.

Pressure is admitted to the cylinder through tube 65 controlled by valve 66, and a gauge 67 measures the pressure attained. Pressure is relieved through an outlet not shown.

To guide the belt to and from this set of stretching pulleys there are mounted on the upright 50, next to the impregnating device, two pulleys 22 and 43.

The stretcher so far described is operated as follows:

A roll of belting to be impregnated and stretched is mounted upon the shaft 13 and fed downward into the pot containing the impregnating solution. The ordinary jacketed glue pot is suitable for sizing the belt with glue, which is a suitable impregnating material for belts which are not subjected to too much moisture. The glue pot 68 is shown heated in the usual manner by a burner 68'. A tool, 69, may be used, if desired, for submerging the belt in the impregnating material. From the impregnating pot the belting passes upward through wringer 15, which expresses any excess of impregnating material drawn upward by the belting. From the wringer the belting passes over the pulleys in the order in which they are numbered from pulley 22 to pulley 43. These two pulleys 22 and 43, are merely for feeding the belting to and from the stretcher. After the full length of belting is fed onto the pulleys, its ends are fastened together, thereby making an endless belt running over pulleys 23 to 42, inclusive.

Belting usually comes in 400 ft. or 500 ft. lengths and the apparatus illustrated is adapted to stretch either length by proper adjustment of the slide 55 and threading of the pulleys. This slide is raised or lowered by a block and tackle and windlass, as described in detail below in connection with the builder pulley sets. When in adjusted position it is held unyieldingly in that position by rod 57.

The stretching is done by opening valve 66 and admitting pressure fluid into cylinder 61. As the piston 60 is raised the belt is stretched, and the resistance gradually becomes greater. This resistance is measured by the gauge 67 and when the gauge registers a predetermined amount the valve may be closed.

The inlet as shown is small, and the movement of the piston should be gradual in order to properly stretch the belt. The tension I use stretches a 500 ft. belt in the neighborhood of 75 feet, and the slide has to move nearly 19 feet. Most of this movement will take place in about half an hour. The gauge registers the pressure in the cylinder and so measures the tension applied to the belt, and the valve is manipulated to keep the tension at the selected point for the necessary length of time, usually several hours with glue size. If desired, an automatic pressure regulator might be employed; but in carrying out the preferred process such a regulator is found to be unnecessary, where leakage can be overcome.

After the belt becomes dried so that it will retain substantially the elongation given it during drying, tension is relieved by allowing the water to flow from cylinder 61. The belt is then cut or its ends unfastened between pulleys 23 and 42. The upper end is connected to a new piece of belting coming under pulley 22 from the impregnator, and the other end of the belt is drawn over pulley 43 to windlass 17. By means of windlass 17 the dried belt is drawn from the stretching pulleys and at the same time a freshly impregnated belt is drawn onto the pulleys. The process of threading the belt over the pulleys is greatly simplified by this procedure.

One of the pulleys, as 23, may be connected with a driving means for driving the belt during the application of the stretching stress for the purpose of evenly distributing the stress throughout the length of the belt.

Sometimes it is desirable to paint one side of the belt, and undesirable to have the painted side contact with the pulleys. Such contact may be avoided by giving the run of the belt a half turn between the pulleys in each instance where its direction is changed, as shown in the drawings.

From the stretcher the belt is put upon the builders, which will be described next, and as the two are identical, but one will be described in detail.

In facing cotton belting with leather it is customary to press successive lengths of the leather and cotton together while the adhesive which unites them is setting.

Near the right of Fig. 3 there is shown a typical press, D, with the opposed press plates, 70, 71, between which the belt is fed in successive lengths. To the right of the press there are shown uprights 72 upon which are mounted pulleys 73, 74. The belt passes from the press over these pulleys 73, 74, and thence to the left and over the pulleys 75 to 87, inclusive, of a pulley set somewhat similar to the stretcher set previously described.

This pulley set is mounted upon a framework consisting of uprights 90, lower beams 91, adjacent beams 92, first floor beams 93, and parallel sets of top beams 94, 95. Upon the uprights 90 adjacent the press are mounted pulleys 75, 86 and 87. Upon the top beams 95 is a pulley 76, while on the bottom beams are pulleys 83 and 85, and on the adjacent beams are pulleys 77, 79 and 81.

There is a slide 96 similar to slide 55 of the stretcher, and carrying pulleys 80 and 82. This slide is supported in guides 97 by a rod 98. When the position of the slide is to be adjusted it is suspended by a yoke 99 from a beam 100 by a block and tackle 101. The rope 102 from this block and tackle passes over guide pulley 103 to windlass 104. The windlass may be operated by a hand crank 105 or by a power belt 106 through gearing 107. In this way the slide can be raised or lowered to adjust the pulley set to belts of different lengths.

Beam 100 may be extended over the stretcher slide and over the slides of both builders, and one windlass and block and tackle may be used for any one of the slides, as needed, by suspending the block and tackle from the beam 100 above the slide in need of adjustment.

Slide 110 carrying pulleys 78 and 84 is moved in vertical guides 111 by a piston 112 actuated by cylinder 113.

In the construction shown the builder is not intended for as long a belt as the stretcher, and is normally used with pre-stretched belts, so that the needed movement of the slide 110 of the builder is much less than that of the corresponding slide 58 of the stretcher. For this reason, cylinder 113 need not extend below the basement and has its upper end fastened at 115 to the first floor beams, 93. Packing, 116, is provided at the upper end of the cylinder surrounding the piston, and pressure is admitted through an inlet pipe 117 by a valve 118 until the desired pressure is indicated on the gauge 119.

The new length of belt is threaded over the pulleys, preferably by pulling it on as the previously treated belt is removed. The ends are then joined, and the desired amount of pressure is exerted by cylinder 113. A convenient means for advancing the belt intermittently as successive lengths of facing material is pressed thereonto is shown by gear wheel 120 on the shaft of pulley 87 meshing with gear 121, which in turn may be actuated in either direction by a ratchet lever 122.

The belt may be driven after it is threaded over the pulleys and before facing is begun in order to evenly distribute the applied tension. This driving may be done by the ratchet lever 122 or it may be done by attaching power to one of the pulleys, pulley 76 for example.

If desired the pulley set indicated as a builder set might be used for the original stretching and drying, and the facing might then be attached without removing the belt from the pulleys.

The best way of utilizing the device above described in the commercial manufacture of belting is the sizing and stretching of a 500 ft. length of cotton belting on the stretcher and allowing it to dry. The next day, the belt will be sufficiently dried, and it is removed and another length threaded on, as described above. When removed, it is cut in two, and one-half threaded upon each builder, and then the facing is applied.

I have found that 250 ft. of facing is about the amount that one belt builder can apply in a day, and the belt appears to be of better and more uniform quality where the length under tension is completed in one day. It is preferable, therefore, to use two builders with one stretcher, in order to complete a 500 ft. length of belt each day when in regular operation.

The desired number of pounds of tension per inch ply having been determined, a calculation is made for each of the widths and numbers of ply showing what the gauge should register for each in order to subject it to the desired tension per inch ply. The results of these calculations are arranged on a chart which is placed in a convenient location so that the workman may at any time consult the chart and determine the proper gauge pressure for the belt with which he is working.

When the belt on the builder is subjected to a strain equal to the point of fixed elongation, it is found that the pressure valve may be closed and, in the absence of leakage, the pressure will remain substantially constant throughout the facing process, in spite of the wetting and subsequent drying which is involved.

When desired, some of the slack may be taken up by adjusting the slide 55 or 96 by means of block and tackle, and the remaining stretching desired may be given by hydraulic means.

It is found that the resulting belt is more flexible, at least initially, where the tension of the builder is less than that of the stretcher. A satisfactory belt for most purposes may be made by using a tension of approximately 100 lbs. per inch ply in the stretcher and 60 lbs. per inch ply in the builder; but these figures are given by way of illustration, and not as limiting the tensions which may be found desirable for particular purposes.

The vertical arrangement of the run of the belt during drying is advantageous because it saves floor space and increases both the speed and uniformity of drying.

While I have described the invention in detail only as applied to the manufacture of leather faced cotton backed belting, the same process would be equally useful with any other suitable facing material, and the process of producing cotton belting of fixed length would be equally useful if it were used without facing and if any suitable length fixing medium were employed. Also the process is capable of use with obvious adaptations in the manufacture of other fibrous products whose stretching in use is disadvantageous. Of these I will mention canvas shoes, tires, sails, canoes, etc., and clotheslines and ropes intended for many other uses. The list might be extended indefinitely, and is intended to be merely suggestive, not exhaustive.

When the product needs to be waterproof, a waterproof impregnating solution or coating is applied. A rubber solution may be used and vulcanized under tension. Tension above the point of fixed elongation, so that the manufactured article will hold its shape, and measured tension, so that uniform products may be produced, are desirable in producing various rubberized fabrics.

A convenient way of applying the paint, mentioned above, is by the use of a coating roller. After the belt is in place on the stretcher and while it is being run to distribute the tension, a pan 130 is placed beside a vertical run of the belt. A roller 131 dips into the paint in the pan and extends over the end of the pan into contact with the belt as it moves downward past the pan. A scraper 132 may be used to remove the excess paint from the roller.

A similar arrangement of roller contacting the underside of a horizontal run of belt has been tried with unsatisfactory results. I believe that the use of the painting roller with the vertical run of belt is new, and that the discovery that such an arrangement gives satisfactory results is important.

Such a roller may be used to apply one or more coatings of length fixing material either before or after the belt is stretched instead of using the impregnating device, and such a process would be particularly useful where it might be desired to have one face of the belt free of the length fixing material.

I claim:

1. The process of making faced cotton backed belting, which consists in subjecting cotton belting to a measured tensile stress known to be above its point of fixed elongation, said belting being impregnated with a substance adapted to harden therein, hardening said substance while maintaining the elongation produced by said strain, and attaching a facing to said belting while subjecting it to a tension sufficient to maintain it elongated to the point of fixed elongation, but less than the first said tensile strain.

2. The process of producing standardized faced cotton backed belting, which consists in impregnating cotton belting with a substance capable of being hardened, subjecting said belting to a standardized stress per inch ply, which stress is above the point of fixed elongation, hardening said substance within the belting while maintaining the elongation resulting from said stress, and thereafter facing the backing under a standardized stress per inch ply sufficient to produce fixed elongation.

3. A process in accordance with claim 2, in which the tension used during preliminary treatment is greater than that used during facing.

4. A pulley set arranged for supporting a belt with the portions between the pulleys extending vertically, consisting of an upper set of pulleys and a lower set of pulleys, certain of these pulleys being in pairs, the pairs of the upper set each consisting of an upper pulley and a lower pulley vertically beneath the upper pulley and of less diameter, and the pairs of the lower set having the arrangement reversed.

5. Apparatus for making faced belting comprising a plurality of pulley sets each adapted to receive a belt, a plurality of working platforms at successive levels beside the pulley sets, apparatus for treating belting with a length fixing material on one of said platforms in feeding relation to one of said pulley sets, and apparatus for applying a facing to belting on another of said platforms in feeding relation to another of said pulley sets.

6. The process of treating textile belting, which comprises impregnating the belting with a length fixing solution, threading it over supports in such a way that the major portion extends vertically and that but one face of the belting is contacted by the supports, applying tension to the belting, moving its past a point in its vertical run, applying a liquid to the uncontacted face as it passes said point, and allowing the impregnated and coated belting to dry while maintaining the tension under which it was coated and with the major portion vertical.

In testimony whereof I hereunto affix my signature.

FRANK E. CLARK.